United States Patent
Meyer et al.

(10) Patent No.: US 11,470,685 B1
(45) Date of Patent: Oct. 11, 2022

(54) METHOD AND APPARATUS FOR IMPROVING COMMUNICATION EFFICIENCY OF INTERNET OF THINGS DEVICES

(71) Applicant: UIPCO, LLC, San Antonio, TX (US)

(72) Inventors: Gregory Brian Meyer, San Antonio, TX (US); Mark Anthony Lopez, Helotes, TX (US); Ravi Durairaj, San Antonio, TX (US); Nolan Serrao, Plano, TX (US); Victor Kwak, Frisco, TX (US); Ryan Thomas Russell, The Colony, TX (US); Christopher Russell, The Colony, TX (US); Ruthie D. Lyle, Durham, NC (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 16/942,866

(22) Filed: Jul. 30, 2020

Related U.S. Application Data

(60) Provisional application No. 62/880,739, filed on Jul. 31, 2019.

(51) Int. Cl.
*H04W 84/20* (2009.01)
*G16Y 30/00* (2020.01)

(52) U.S. Cl.
CPC ............. *H04W 84/20* (2013.01); *G16Y 30/00* (2020.01)

(58) Field of Classification Search
CPC .............................. G16Y 30/00; H04W 84/20
See application file for complete search history.

(56) References Cited

U.S. PATENT DOCUMENTS

2017/0171359 A1* 6/2017 Ando .................. H04L 41/0233

FOREIGN PATENT DOCUMENTS

| CN | 104320823 B * 3/2018 | |
| EP | 2110999 A1 * 10/2009 | ............ H04W 40/32 |

* cited by examiner

*Primary Examiner* — Zhensheng Zhang
(74) *Attorney, Agent, or Firm* — Plumsea Law Group, LLC

(57) ABSTRACT

A system and method for reducing wireless traffic among a plurality of IoT devices and an access point is disclosed. The method and system may establish communication among a plurality of Internet of Things (IOT) devices and establish a set of similar IoT devices from among the plurality of IoT devices. One of the similar IoT devices may be designated as a managing IoT device and the remaining IoT devices in set of similar IoT devices may be designated as controlled IoT devices. Wireless traffic from the access point may be transmitted through the managing IoT device to controlled IoT devices. Wireless traffic from the controlled IoT devices may be transmitted to the access point through the managing IoT device. Thus, wireless traffic between the access point and controlled IoT devices is reduced.

20 Claims, 8 Drawing Sheets

METHOD AND APPARATUS FOR IMPROVING COMMUNICATION EFFICIENCY OF INTERNET OF THINGS DEVICES

CROSS-REFERENCE TO RELATED APPLICATIONS

This application claims the benefit of Provisional Patent Application No. 62/880,739 filed Jul. 31, 2019, and titled "Method and Apparatus for Improving Communication Efficiency of Internet of Things Devices," which is incorporated by reference herein in its entirety.

TECHNICAL FIELD

The present disclosure generally relates to methods and systems for enhancing communication efficiency, and in particular, by reducing wireless traffic between an access point and similar IoT devices.

BACKGROUND

Internet of Things (IoT) devices have many applications. For example, in homes, IoT devices may be applied to lighting fixtures, thermostats, media devices, security systems, and other appliances found in a home. Because the number of IoT devices in homes continues to increase and the IoT devices are frequently configured to communicate wirelessly through an access point to a mobile computing device, this greatly increases wireless traffic, which leads to congestion at the access point.

There is a need in the art for a system and method that addresses the shortcomings discussed above.

SUMMARY

In one aspect, there is provided a method for reducing wireless traffic among a plurality of IoT devices and an access point including the steps of establishing communication among the plurality of IoT devices; establishing a set of similar IoT devices from among the plurality of IoT devices; designating one IoT device from the set of similar IoT devices as a managing IoT device and the remaining IoT devices in the set of similar IoT devices as controlled IoT devices; directing wireless traffic from the access point, which is destined for controlled IoT devices, to the managing IoT device for transmission to the controlled IoT devices to reduce wireless traffic between the access point and the controlled IoT devices; and directing wireless traffic from the controlled IoT devices, which is destined for the access point, to the managing IoT device for transmission to the access point to reduce wireless traffic between the access point and the controlled IoT devices.

In another aspect, there is provided a system for reducing wireless traffic among a plurality of IoT devices and an access point including at least one memory comprising instructions and at least one hardware processor to execute the instructions within the at least one memory to implement: establishing communication among the plurality of IoT devices; establishing a set of similar IoT devices from among the plurality of IoT devices; designating one IoT device from the set of similar IoT devices as a managing IoT device and the remaining IoT devices in the set of similar IoT devices as controlled IoT devices; and configuring the managing IoT device to be capable of communicating with the access point for wireless traffic, wherein the managing IoT device is configured to direct wireless traffic received from the access point, which is destined for controlled IoT devices, to the managing IoT device for transmission to the controlled IoT devices to reduce wireless traffic between the access point and the controlled IoT devices, and wherein the managing IoT device is configured to receive and direct wireless traffic from the controlled IoT devices, which is destined for the access point, to reduce wireless traffic between the access point and the controlled IoT devices.

In another aspect, there is provided a system for designating a managing Internet of Things (IoT) device among a plurality of IoT devices to communicate wireless traffic to an access point through the managing IoT device, including at least one memory comprising instructions and at least one hardware processor to execute the instructions within the at least one memory to implement: establishing communication among the plurality of IoT devices; receiving identification signals during the established communication from the plurality of IoT devices to provide each IoT device with a type of other IoT devices; forming an ad hoc network among IoT devices having the same type; determining which of the IoT devices in the ad hoc network has the greatest signal strength during communication with the access point; designating one of the IoT devices in the ad hoc network having the greatest signal strength as the managing IoT device and the remaining IoT devices in the ad hoc network as controlled IoT devices; and directing wireless traffic between the access point and IoT devices in the ad hoc network through the managing IoT device to reduce wireless traffic between the access point and the controlled IoT devices.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

Figure 1:
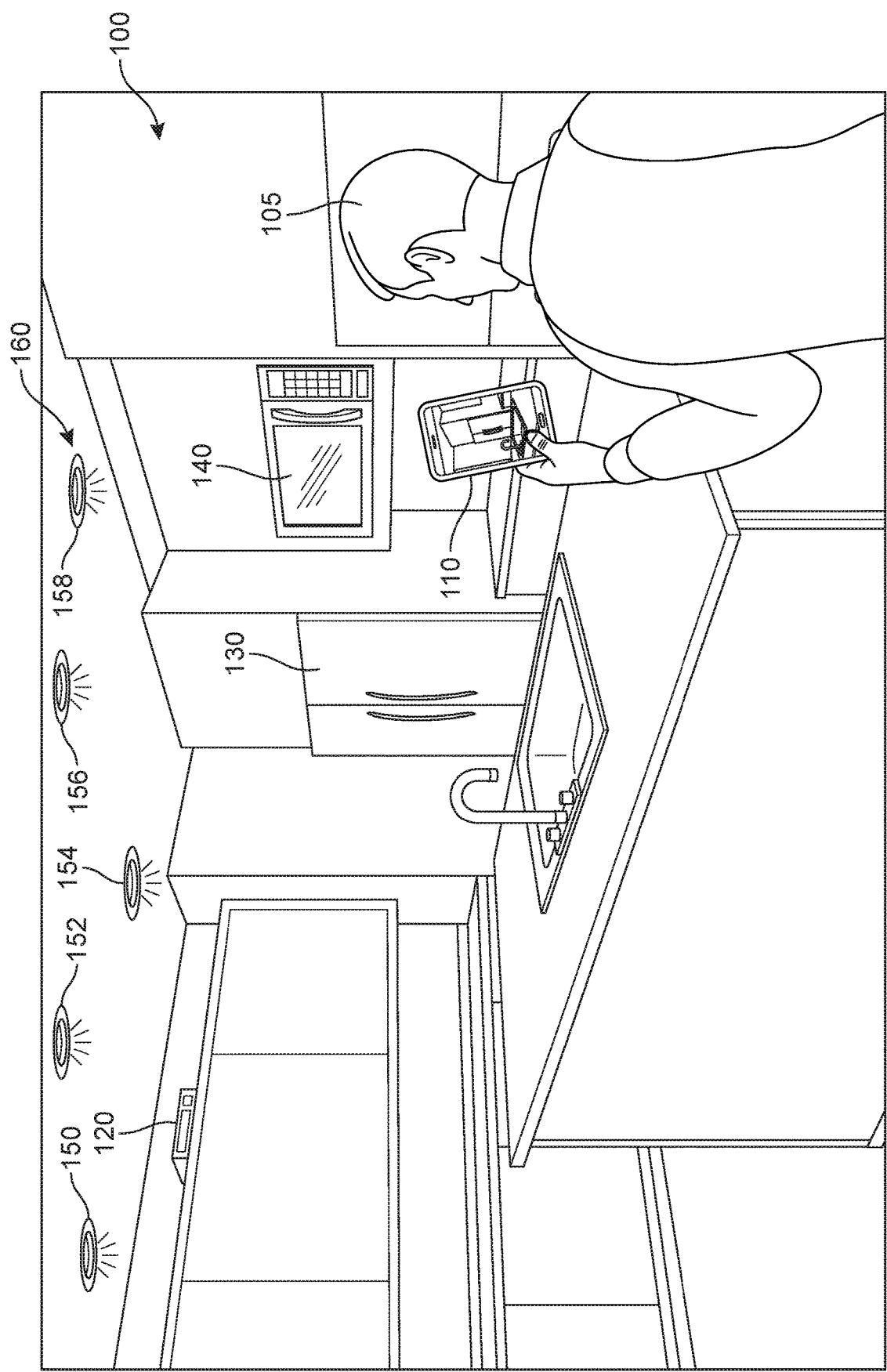
FIG. 1 is a schematic view of a plurality of IoT devices according to an embodiment.

IoT devices are computing devices installed in everyday objects to connect the objects to the Internet. The number of IoT devices found in structures such as homes continues to increase and the functionality of the IoT devices continually increases. Accordingly, more and more IoT devices in the home request access to the Internet more frequently through an access point located in the home. This causes increased wireless traffic between the access point and the IoT devices to access the Internet. For example, objects in the home frequently include appliances such as cameras, security systems, televisions, entertainment systems, washers, dryers, microwaves, dish washers, refrigerators, coffee makers, thermostats for heaters and air conditioners, and lighting fixtures. All these appliances frequently include at least one IoT device for each appliance. These appliances may also be referred to as smart appliances and the home containing one or more smart appliances may be referred to as a smart home. A user may communicate with these smart appliances by using one or more applications on a mobile computing device within or outside of the home. Examples of mobile computing devices may include a smartphone, a tablet, a smartwatch, a smart glass, a smart helmet, and a laptop. In addition, although one or more embodiments refer to the use of mobile computing devices, any computing device could run software applications in embodiments of the present application.

Because of the increased number of requests from an increased number of IoT devices found in the home to an access point for access to the Internet, embodiments of the present application provide systems, devices, and methods for reducing wireless traffic among a plurality of IoT devices and an access point to reduce congestion at the access point. Previously, each IoT device would wirelessly communicate with the access point to gain access to the Internet causing congestion at the access point due to so many requests for communication. In one or more embodiments, IoT devices may communicate with each other before transmitting a request to an access point to establish a set of similar IoT devices from among the plurality of IoT devices. By establishing a set of similar IoT devices from among a plurality of IoT devices, one IoT device of the set of similar IoT devices may be designated as a managing IoT device and the remaining IoT devices in the set of similar IoT devices may be designated as controlled IoT devices. The managing IoT device may wirelessly communicate with the access point on behalf of the controlled IoT devices. Thus, the controlled IoT devices may wirelessly communicate with the managing IoT device instead of the controlled IoT devices wireless communicating directly with the access point.

Once the managing IoT device and the controlled IoT devices are designated, the managing IoT device may generate and store in memory a table of all the controlled IoT devices. For example, all internet protocol (IP) addresses of each controlled IoT device may be stored in this table in memory of the managing IoT device. The managing IoT device may also notify the access point that all wireless communication to the controlled IoT devices must be directed to the managing IoT device. The access point may modify a table stored in the memory of the access point to direct the access point to wireless communicate all information intended for controlled IoT devices to the managing IoT device. In addition, each controlled IoT device may store in a memory the IP address of the managing IoT device and direct all wireless traffic intended for the access point to the managing IoT device instead of the access point. Accordingly, the managing IoT device manages wireless communication for a set of similar IoT devices in order to reduce wireless traffic at the access point to avoid congestion at the access point and improve communication efficiency.

FIG. 1 is a schematic view of a plurality of IoT devices according to an embodiment. FIG. 1 shows a kitchen 100 as an example of a room in a home including IoT devices. A user 105 holds a mobile computing device 110, which may be used to communicate with IoT devices in the kitchen 100. The computing device 110 may be wirelessly communicating with an access point 120 or the Internet through a cellular network (not shown). IoT devices in the kitchen 100 may be wirelessly communicating with the access point 120. Through the access point 120, IoT devices in the kitchen 100 may have access to the Internet and may wirelessly connect to the mobile computing device 110. The mobile computing device 110 may have an application running on the mobile computing device 110 to communicate with the IoT devices by way of the access point 120. Alternatively, the application running on the mobile computing device 110 may communicate with the IoT devices by way of the Internet through a cellular network, which wireless communicates to the access point 120. It is understood that these wireless communications are exemplary embodiments.

Figure 2:
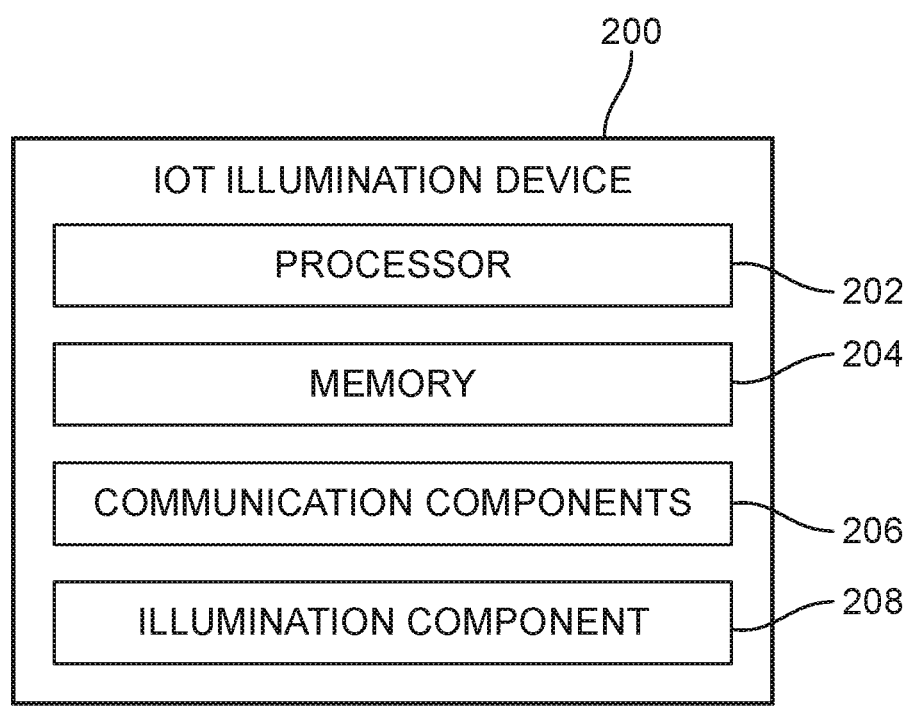
FIG. 2 is a schematic view of an IoT device according to an embodiment.

The plurality of IoT devices shown in FIG. 1 may include different types of IoT devices. A refrigerator/freezer 130 (hereinafter referred to as "refrigerator 130") may include one type of IoT device and a microwave 140 may include another IoT device. The plurality of IoT devices in FIG. 1 may also include first IoT illumination device 150, second IoT illumination device 152, third IoT illumination device 154, fourth IoT illumination device 156, and fifth IoT illumination device 158. In some embodiments, these IoT illumination devices may be similar. In those embodiments where the IoT illumination devices are similar, those IoT illumination devices may comprise a first set of IoT illumination devices. An example of the internal components of at least one of the first set of IoT illumination devices 160 is shown in FIG. 2. FIG. 2 shows IoT illumination device 200, which includes a processor 202, a memory 204, one or more communication components 206 and illumination component 208. The one or more communication components 206 may include one or more wireless communication components such as, a WIFI component, a personal area network (PAN) component, a near field communication (NFC) component, and a Bluetooth component to communicate with other IoT devices in the kitchen 100 and/or the access point 120.

Figure 3:
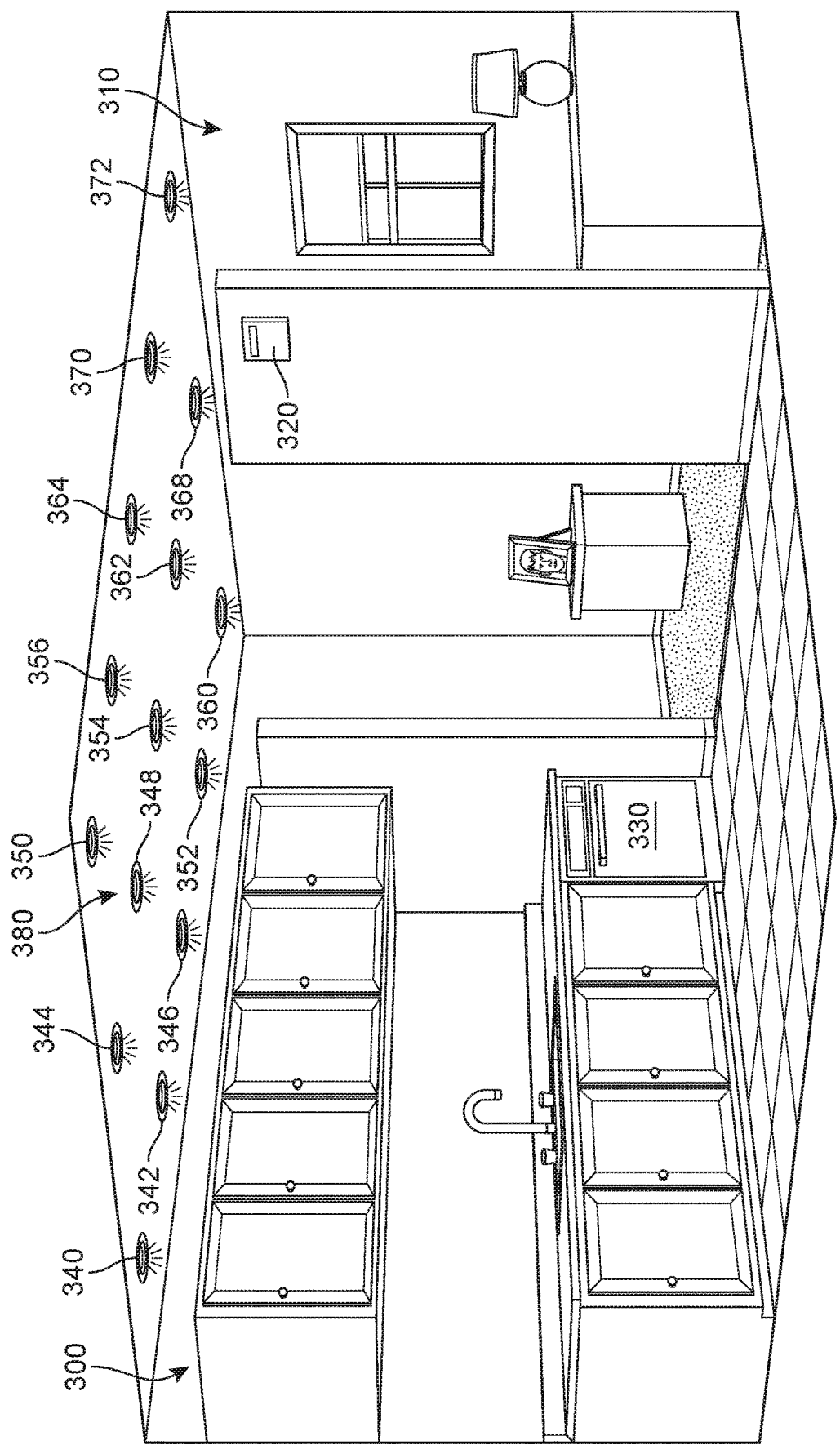
FIG. 3 is a schematic view of a plurality of IoT devices according to an embodiment.

FIG. 3 is a schematic view of a plurality of IoT devices according to another embodiment. FIG. 3 shows a kitchen 300 and a living space 310 with an opening to allow individuals to walk between the two rooms. An access point 320 is located on a wall in the kitchen 310 in this example. The dishwasher 330 in FIG. 3 includes an IoT device. FIG. 3 also shows IoT illumination devices in a ceiling of the kitchen 300 and IoT illumination devices in a ceiling of the living space 310. More specifically, FIG. 3 shows sixth IoT illumination device 340, seventh IoT illumination device 342, eighth IoT illumination device 344, ninth IoT illumination device 346, tenth IoT illumination device 348, eleventh IoT illumination device 350, twelfth illumination device 352, thirteenth IoT illumination device 356 in kitchen 300 and fourteenth IoT illumination device 360, fifteenth IoT illumination device 362, sixteenth IoT illumination device 364, seventeenth IoT illumination device 366, eighteenth IoT illumination device 368, nineteenth IoT illumination device 370, and twentieth IoT illumination device 372. In some embodiments, these IoT illumination devices in FIG. 3 may be similar. In those embodiments where the IoT illumination devices are similar, those IoT illumination devices may comprise a second set of IoT illumination devices. An example of the internal components of at least one of the second set of IoT illumination devices 160 is shown in FIG. 2.

Figure 4:
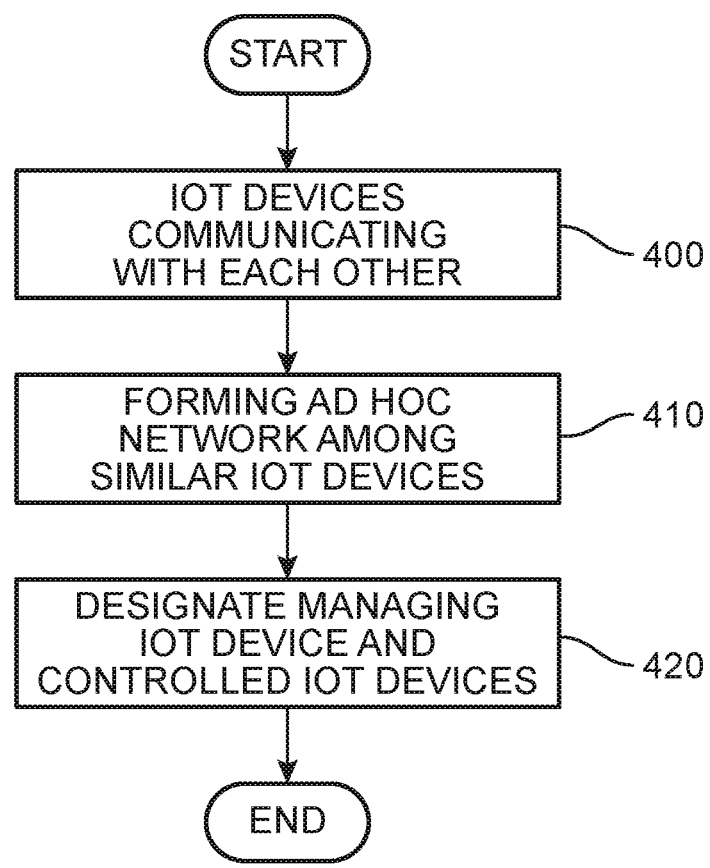
FIG. 4 is a schematic view of a process for reducing wireless traffic among a plurality of IoT devices and an access point according to an embodiment.
Figure 5:
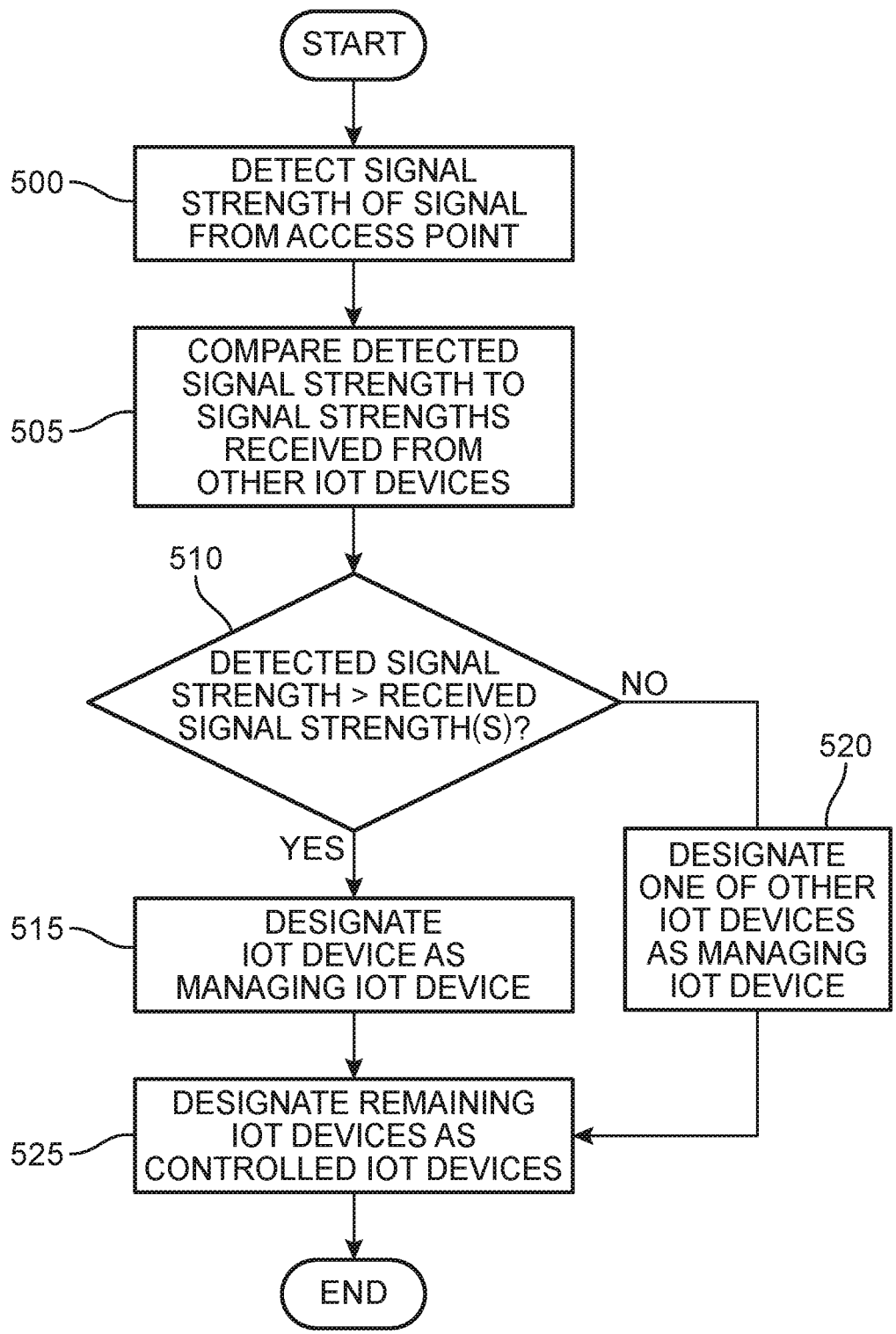
FIG. 5 is a schematic view of a process for reducing wireless traffic among a plurality of IoT devices and an access point according to an embodiment.

FIGS. 4 and 5 are schematic views of processes for designating a management IoT device for reducing wireless traffic among a plurality of IoT devices and an access point according to embodiments by referencing FIGS. 1-3. For example, FIG. 1 shows a plurality of IoT devices in kitchen 100. The IoT device of the refrigerator 130, the IoT device of the microwave 140, and the first set of IoT illumination devices 160 may communicate with each other (operation 400), so that each IoT device can determine whether the IoT device is the same type of IoT device as other IoT devices in the kitchen 100. Each IoT device has an identification signal which it can transmit to other IoT devices. Identification signals received by IoT devices can be used by the IoT devices to determine whether IoT devices are similar or different.

Based on this communication, the IoT device of the refrigerator 130 recognizes that there are no similar IoT devices. Therefore, the IoT device of the refrigerator 130 communicates directly with access point 120. Similarly, based on the above communication among IoT devices, the IoT device of microwave 140 also recognizes that there are no similar IoT devices. Therefore, the IoT device of the microwave 140 also communicates directly with the access point 120. Since there is only one type of IoT device of refrigerator 130 and one type of IoT device of microwave 140, the IoT device of refrigerator 130 and the IoT device of microwave 140 do not form a set and communicate directly with the access point 120.

The first set of IoT illumination devices 160 in kitchen 100 are a different type of IoT device than the IoT device of refrigerator 130 and the IoT device of microwave 140. However, first IoT illumination device 150, second IoT illumination device 152, third IoT illumination device 154, fourth IoT illumination device 156, and fifth IoT illumination device 158 are similar IoT devices and form the first set 160. The first set of similar IoT devices 160 may be established by the first IoT illumination device 150, the second IoT illumination device 152, the third IoT illumination device 154, the fourth IoT illumination device 156, and the fifth IoT illumination device 158 receiving identification signals from each other while all the IoT devices in kitchen 100 are communicating with each other to share identification signals. Accordingly, first IoT illumination device 150, second illumination IoT device 152, third illumination IoT device 154, fourth Illumination IoT device 156, and fifth illumination IoT device 158 form a first set 160 and the first set can then form an ad hoc network in operation 410.

After forming the ad hoc network in operation 410, the first IoT illumination device 150, the second IoT illumination device 152, the third IoT illumination device 154, the fourth IoT illumination device 156, and the fifth IoT illumination device 158 designate a managing IoT device to communicate with access point 120 and designate controlled IoT devices. The controlled IoT devices communicate with the access point 120 through the managing IoT device instead of directly with the access point 120 (operation 420). By designating one managing IoT device for the first set of IoT illumination devices 160, the number of IoT devices communicating with access point 120 is reduced from seven to three in the kitchen 100 shown in FIG. 1.

Once the managing IoT device and the controlled IoT devices are designated (operation 420), the managing IoT device may generate and store in memory a table of all the controlled IoT devices as part of operation 420. For example, all internet protocol (IP) addresses of each controlled IoT device may be stored in this table in memory of the managing IoT device. The managing IoT device may also notify the access point 120 that all wireless communication to the controlled IoT devices must be directed to the managing IoT device. The access point 120 may modify a table stored in the memory of the access point 120 to direct the access point to wirelessly communicate all information intended for controlled IoT devices to the managing IoT device. In addition, each controlled IoT device may store in a memory the IP address of the managing IoT device and direct all wireless traffic intended for the access point 120 to the managing IoT device. Accordingly, the managing IoT device manages wireless communication for a first set of similar IoT devices 160 in order to reduce wireless traffic at the access point to avoid congestion at the access point and improve communication efficiency. Accordingly, this is one example of a method and system for reducing wireless traffic among a plurality of IoT devices and an access point 120.

By referring to FIGS. 3 and 4, another example of a method and system for reducing wireless traffic among a plurality of IoT devices and an access point in rooms in a home is shown. In the example shown in FIG. 3, there are two rooms including a kitchen 300 and a living space 310 with an access point 320 positioned on a wall of a kitchen 300. The dishwasher 330 includes an IoT device, which is different type from all other IoT devices in the room. This is determined by communication among all IoT devices in both the kitchen 100 and the living space 310 (operation 400). The IoT device of dishwasher 330 does not form an ad hoc network with other IoT devices and communicates directly with the access point 320.

In this example, FIG. 3 also shows sixth IoT illumination device 340, seventh IoT illumination device 342, eighth IoT illumination device 344, ninth IoT illumination device 346, tenth IoT illumination device 348, eleventh IoT illumination device 350, twelfth illumination device 352, thirteenth IoT illumination device 356 in kitchen 300 and fourteenth IoT illumination device 360, fifteenth IoT illumination device 362, sixteenth IoT illumination device 364, seventeenth IoT illumination device 366, eighteenth IoT illumination device 368, nineteenth IoT illumination device 370, and twentieth IoT illumination device 372. All of the IoT illumination devices in kitchen 300 and all of the IoT illumination devices in living space 310 are similar types of IoT devices (in this example IoT illumination devices) and form a second set of IoT illumination devices 380. Accordingly, the second set of IoT illumination devices 380 in kitchen 300 and in living space 310 form an ad hoc network in operation 410. After forming the ad hoc network in operation 410, the IoT illumination devices in the second set of IoT illumination devices 380 designate a managing IoT device to communicate with access point 320. The IoT illumination devices in the second set of IoT illumination devices 380 also designate controlled IoT devices. The controlled IoT devices communicate with the access point 320 through the managing IoT device instead of communicating directly with the access point 320 (operation 420). By designating one managing IoT device for the second set of IoT illumination devices 380, the number of IoT devices communicating with access point 320 in kitchen 300 and living space 310 is reduced from sixteen to two in the kitchen 300 and living space 310 shown in FIG. 3.

Once the managing IoT device and the controlled IoT devices are designated (operation 420), the managing IoT device may generate and store in memory a table of all the controlled IoT devices as part of operation 420. For example, all internet protocol (IP) addresses of each controlled IoT device may be stored in this table in memory of the managing IoT device. The managing IoT device may also notify the access point 320 that all wireless communication to the controlled IoT devices must be directed to the managing IoT device. The access point 320 may modify a table stored in the memory of the access point 320 to direct the access point to wireless communicate all information intended for controlled IoT devices to the managing IoT device. In addition, each controlled IoT device may store in a memory the IP address of the managing IoT device and direct all wireless traffic intended for the access point 320 to the managing IoT device. Accordingly, the managing IoT device manages wireless communication for a second set of similar IoT devices in order to reduce wireless traffic at the access point to avoid congestion at the access point 320 and improve communication efficiency. Accordingly, this is another example of a method and system for reducing wireless traffic among a plurality of IoT devices and an access point.

FIG. 5 is a schematic view of operation 420 of FIG. 4 according to an embodiment. FIG. 5 is an example of a method of designating one IoT device in an ad hoc network as a managing IoT device and designating the remaining IoT devices in the ad hoc network as controlled IoT devices. In the example shown in the kitchen 100 of FIG. 1, the IoT illumination devices in the first set of IoT illumination devices 160 can detect a signal strength of signal an access point 120. For example, the first IoT illumination device 150, can determine the strength of one or more communication signals between the first IoT illumination device 150 and the access point 120, and communicate this signal strength to the second IoT illumination device 152, the third IoT illumination device 154, the fourth IoT illumination device 156, and the fifth IoT illumination device 158. Each of the IoT illumination devices in the first set of IoT illumination devices 160 has a memory 204 to store the signal strength between the first illumination device 150 and access point 120. Similarly, the second IoT illumination device 152 can determine the strength of the one or more communication signals between the second IoT illumination device 152 and the access point 120. The second IoT illumination device 152 can communicate this signal strength to the first IoT illumination device 150, the third IoT illumination device 154, the fourth IoT illumination device 156, and the fifth IoT illumination device 158. Each of the IoT illumination devices in the first set of IoT illumination devices 160 has a memory 204 to store the signal strength between illumination device 152 and access point 120. Each of the remaining IoT illumination devices, which includes third IoT illumination device 154, fourth IoT illumination device 156, and fifth IoT illumination device 158, can perform similar operations. Accordingly, the signal strength between each IoT illumination device in kitchen 100 and the access point 120 can be detected, transmitted to other IoT illumination devices in the ad hoc network, and stored in a memory of each IoT illumination device in the ad hoc network (operation 500).

After the signal strengths are detected in operation 500, each of the IoT illumination devices in the first set of IoT illumination devices 160 can compare its own signal strength in communicating with the access point 120 with the signal strengths provided by the other IoT illumination devices. For example, first IoT illumination device 150 can compare its own signal strength in communication with access point 120 with the signal strengths received from the second IoT illumination device 152, third illumination IoT device 154, fourth Illumination IoT device 156, and fifth illumination IoT device 158 (operation 505). In this example, if the detected signal strength between IoT illumination device 150 and access point 120 is greater than the signal strengths received from the second illumination IoT device 152, third illumination IoT device 154, fourth Illumination IoT device 156, and fifth illumination IoT device 158, then IoT illumination device 150 is designated as the managing IoT device in operation 515 and the remaining IoT illumination devices in the ad hoc network are designated as controlled IoT devices (operation 525).

As noted above, each of the other IoT illumination devices in the first set of IoT illumination devices 160 also perform operations 500 through 510. For example, second IoT illumination device 152 can compare its own signal strength in communication with access point 120 with the signal strengths received from first illumination IoT device 150, third illumination IoT device 154, fourth Illumination IoT device 156, and fifth illumination IoT device 158 (operation 505). If the detected signal strength between IoT illumination device 152 and access point 120 is not greater than all the received signal strengths from first illumination IoT device 150, third illumination IoT device 154, fourth Illumination IoT device 156, and fifth illumination IoT device 158, the IoT illumination device 152 designates one of the other IoT illumination devices in the first set of IoT illumination devices 160 as the managing IoT device (operation 520). In this example, the second IoT illumination device 152 would designate (recognize) that the first IoT illumination device 150 as the managing IoT device, because the first IoT illumination device 150 has the greatest signal strength. The second IoT illumination device 152 would then designate all the remaining IoT illumination devices, which include second illumination IoT device 150, third illumination IoT device 154, fourth Illumination IoT device 156, and fifth illumination IoT device 158, as controlled IoT devices (operation 525). Although signal strength is used in the examples shown in FIG. 3 and FIG. 4, other comparisons may be used to designate a managing IoT device such as designating the IoT device in closest the proximity to the access point among all the IoT devices in the ad hoc network. The implementation of the designation of an IoT device as a managing IoT device and other IoT devices as controlled IoT devices may also be implemented in operation 430 by using tables and IP addresses as discussed above.

Figure 6:
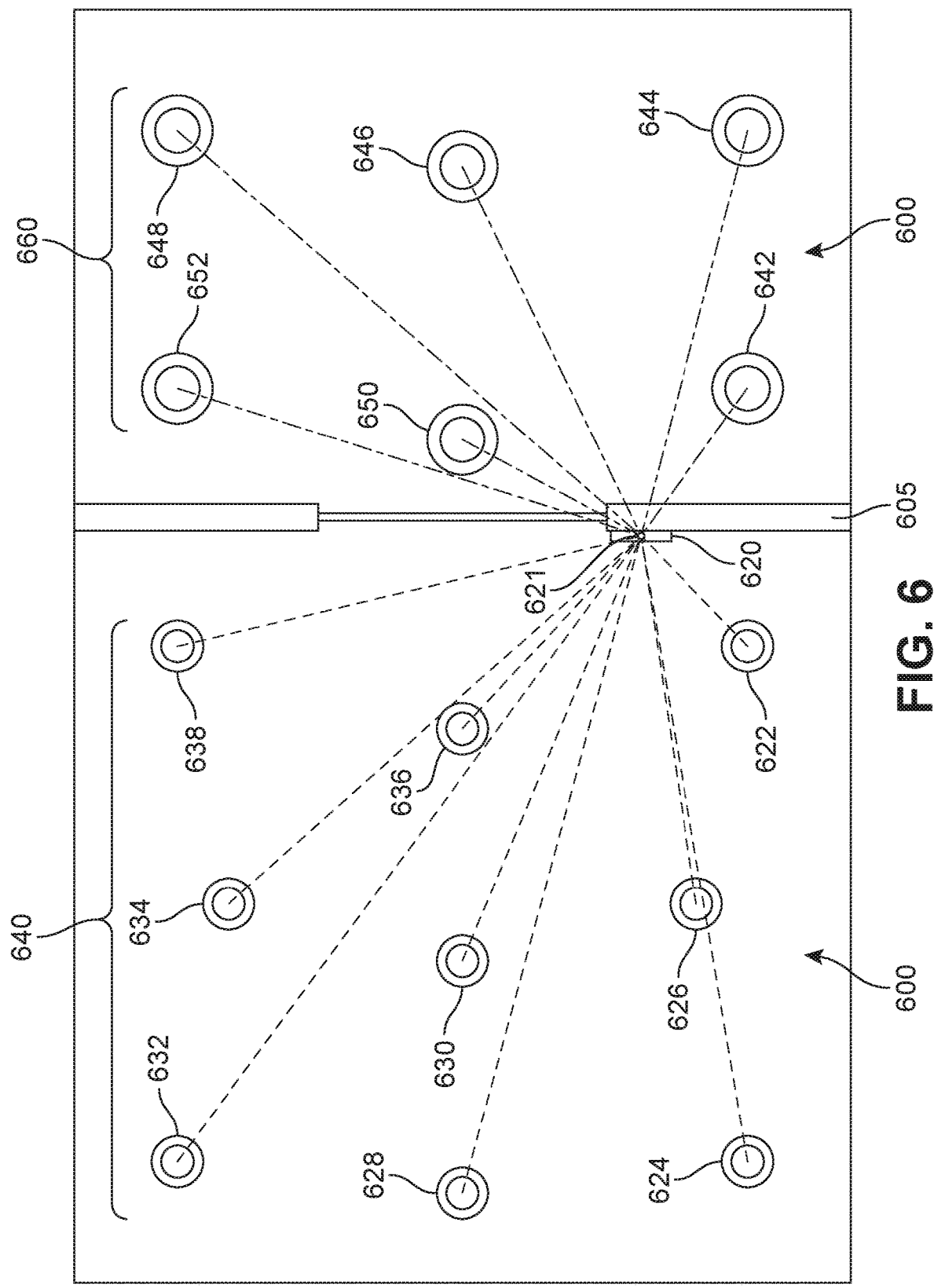
FIG. 6 and FIG. 7 are schematic views of a plurality of IoT devices according to an embodiment, which show advantages of embodiments.
Figure 7:
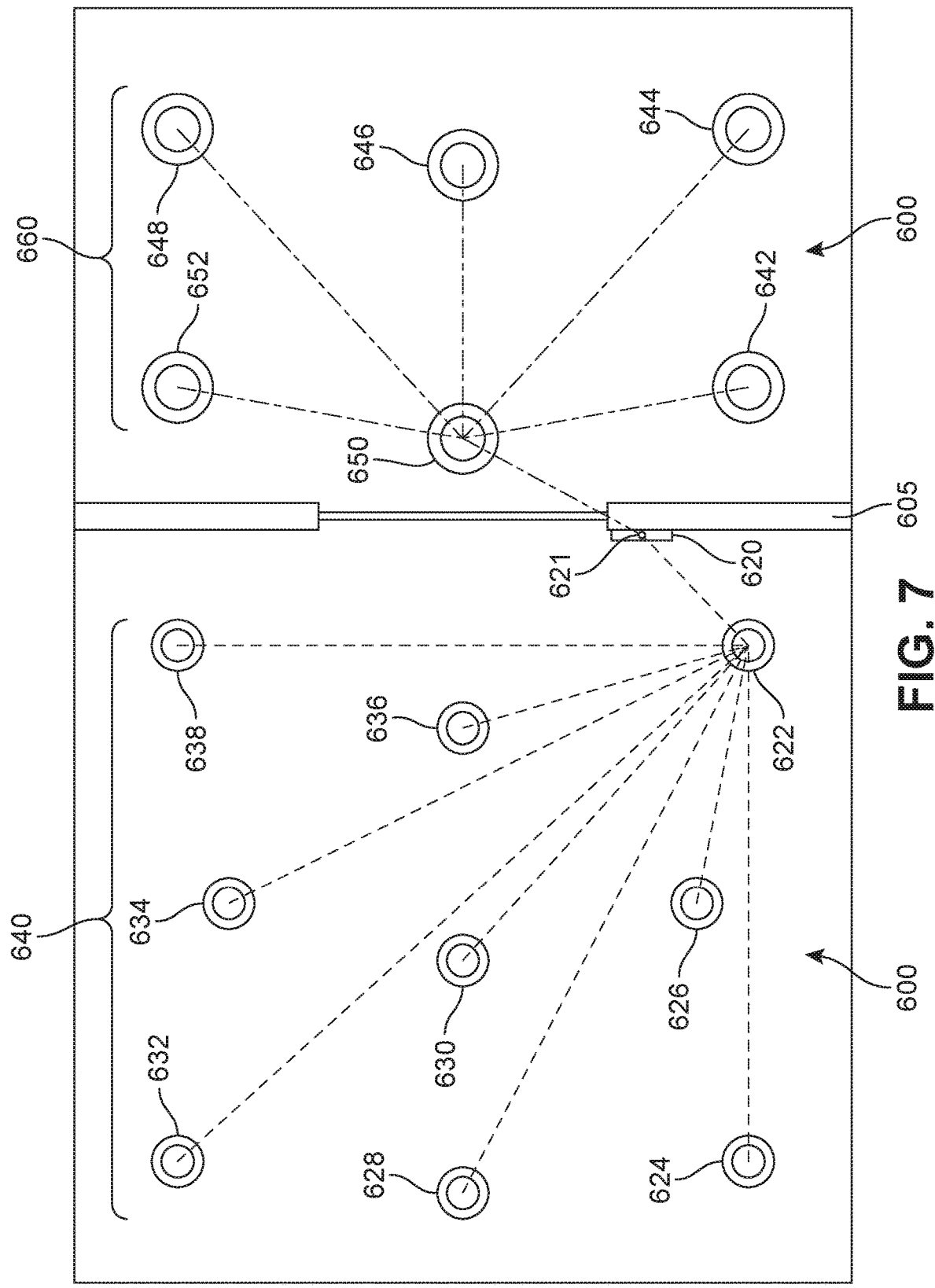

FIG. 6 and FIG. 7 are schematic views of a plurality of IoT illumination devices in a ceiling 600 of a home in a couple of different rooms according to an embodiment, which show advantages of embodiments. For example, the ceiling 600 of rooms in FIG. 6 and FIG. 7 show an access point 620 including an antenna 621. The access point 620 directly communicates with all the IoT illumination devices on the ceiling 600. The IoT illumination devices on the ceiling 600 include first IoT illumination device 622, second IoT illumination device 624, third IoT illumination device 626, fourth IoT illumination device 628, fifth IoT illumination device 630, sixth IoT illumination device 632, seventh IoT illumination device 634, eighth IoT illumination device 636, and ninth IoT illumination device 638. In some embodiments, the first IoT illumination device 622 through the ninth IoT illumination device 638 may be similar. In those embodiments, where the first IoT illumination device 622 through the ninth IoT illumination devices 638 are similar, those devices may comprise a third set of IoT illumination devices 640. As shown in FIG. 6, if each of the IoT illumination devices in the third set of IoT illumination devices 640 communicates directly with access point 620, this may cause congestion and communication delays at the access point 620.

However, in one or more embodiments as shown in FIG. 7, the third set of IoT illumination devices 640 are similar and may form an ad hoc network. After forming the ad hoc network, the first IoT illumination device 622 through the ninth IoT illumination devices 638 in the third set 640 may communicate with each other to designate a managing IoT illumination device. Many different criteria or procedures may be used to determine or select a managing IoT illumination device. It should be noted that this selection process may be done automatically and without human intervention. In some cases, for example, signal strength may be used to determine a managing IoT device.

In the embodiment shown in FIG. 7, signal strength is used to automatically select a managing IoT illumination device. In this embodiment, signal strength between each IoT illumination device in the third set 640 and the access point 620 can be detected. In some embodiments, signal strength information may be shared between the IoT devices within the third set 640 of IoT devices. In some cases, signal strength information may be transmitted to other IoT illumination devices in the third set 640. The signal strength information may optionally be stored in a memory of each IoT illumination device in the third set 640. In some embodiments, the third set 640 may designate the IoT illumination device of the third set 640 having the highest signal strength as the managing IoT illumination device. The remaining IoT illumination devices in the third set 640 may be designated as controlled IoT illumination devices.

The designated managing IoT illumination device of the third set 640 communicates directly with the access point 620. The controlled IoT illumination devices of the third set 640 communicate with the access point 620 through the managing IoT illumination device of the third set 640. As shown in FIG. 7, the first IoT illumination device 622 is designated as the managing IoT illumination device to communicate directly with the access point 620. The second IoT illumination device 624 through the ninth IoT illumination devices 638 of the third set 640 are designated as controlled IoT illumination devices. The controlled IoT illumination devices of the third set 640 communicate with the access point 620 through the managing IoT illumination device of the third set 640 as shown in FIG. 7.

As shown in FIG. 6 and FIG. 7, the IoT illumination devices on the ceiling 600 further include tenth IoT illumination device 642, eleventh IoT illumination device 644, twelfth IoT illumination device 646, thirteenth IoT illumination device 648, fourteenth IoT illumination device 650, and fifteenth IoT illumination device 652. In some embodiments, the tenth IoT illumination device 642 through the fifteenth IoT illumination device 652 may be different from the third set of IoT Illumination devices. However, in some embodiments, the tenth IoT illumination device 642 through the fifteenth IoT illumination device 652 may be similar. In those embodiments, where the tenth IoT illumination device 642 through the fifteenth IoT illumination devices 652 are similar, those devices may comprise a fourth set of IoT illumination devices 660. As shown in FIG. 6, if each of the IoT illumination devices in the fourth set of IoT illumination devices 660 communicates directly with access point 620, this may cause additional congestion and communication delays at the access point 620.

However, in one or more embodiments as shown in FIG. 7, the fourth set 660 of IoT illumination devices are similar and may form another ad hoc network. After forming another ad hoc network, the tenth IoT illumination device 642 through the fifteenth IoT illumination devices 652 in the fourth set may communicate with each other to designate a managing IoT illumination device. Many different criteria or procedures may be used to determine or select a managing IoT illumination device. It should be noted that this selection process may be done automatically and without human intervention. In some cases, signal strength may be used to determine a managing IoT device.

In the embodiment shown in FIG. 7, signal strength is used to automatically select a managing IoT illumination device. In this embodiment, signal strength between each IoT illumination device in the fourth set 660 and the access point 620 can be detected. In some embodiments, signal strength information may be shared between the IoT devices within the fourth set 660 of IoT devices. In some cases, signal strength information may be transmitted to other IoT illumination devices in the fourth set 660. The signal strength information may be optionally stored in a memory of each IoT illumination device in the fourth set 660. In some embodiments, the fourth set 660 may designate the IoT illumination device of the fourth set 660 having the highest signal strength as the managing IoT illumination device. The remaining IoT illumination devices in the fourth set 660 may be designated as controlled IoT illumination devices.

The designated managing IoT illumination device of the fourth set 660 communicates directly with the access point 620. The controlled IoT illumination devices of the fourth set 660 communicate with the access point 620 through the managing IoT illumination device of the fourth set 660. As shown in FIG. 7, the fourteenth IoT illumination device 650 is designated as the managing IoT illumination device of the fourth set 660 to communicate directly with the access point 620. Although the tenth IoT illumination device 642 may be closer in proximity to the access point 620 than the fourteenth IoT illumination device 650, the signal strength of the fourteenth IoT illumination device 650 is greater than the signal strength of the tenth IoT illumination device 642 due to the wall 605. The tenth IoT illumination device 642, eleventh IoT illumination device 644, twelfth IoT illumination device 646, thirteenth IoT illumination device 648, and fifteenth IoT illumination device 652 of the fourth set 660 are designated as controlled IoT illumination devices. The controlled IoT illumination devices of the fourth set 660 communicate with the access point 620 through the managing IoT illumination device of the fourth set 660 as shown in FIG. 7.

Because of the large number of similar IoT illumination devices directly communicating with the access point 620, this may lead to congestion and communication delays for all IoT devices in a home. FIG. 6 and FIG. 7 shows an advantage of embodiments in reducing wireless traffic among a plurality of IoT devices and an access point 620 in a ceiling 600 of rooms in a home. As shown in FIG. 6, fifteen IoT illuminating devices are communicating with one access point 620 causing congestion and communication delays. However, by designating a managing IoT illumination device for the third set of similar IoT illumination device and the fourth set of similar IoT illumination devices, the number of IoT illumination devices is reduced from fifteen to two, which reduces wireless traffic at the access point.

Some embodiments may include provisions to improve communications among IoT illumination devices within a set of IoT illumination devices such as the third set of IoT illumination devices 640. As shown in FIG. 7, the third set of IoT illumination devices 640 are similar and may form an ad hoc network. In some cases, a relay device may be designated to improve communications such as between two IoT illumination devices within the third set of IoT illumination devices 640. In the example shown in FIG. 7, a situation may arise in which the first IoT illumination device 622 has difficulty in communicating with the sixth IoT illumination device 632. In some embodiments, the signal strength is not strong enough to reliably send and receive information between IoT illumination devices such as the first IoT illumination device 622 and the sixth IoT illumination device 632. In these situations, the ad hoc network formed by the third set of IoT illumination devices 640 may designate a relay device. This designated relay device has the ability to communicate effectively and reliably with both the first IoT illumination device 622 and the sixth IoT illumination device 632. Generally, the ad hoc network selects a relay device which can reliably and effectively provide communication between the first IoT illumination device 622 and the sixth IoT illumination device 632. This relay device may be designated from among the IoT illumination devices in the third set of IoT illumination devices 640, such as the fifth IoT illumination device 630. For example, the fifth IoT illumination device 630 has clear uninterrupted communication between the first IoT illumination device 622 and the sixth IoT illumination device 632.

After the fifth IoT illumination device 630 has been selected as the relay device, the ad hoc network of the third set of IoT illumination devices 640 may instruct both the first IoT illumination device 622 and the sixth IoT illumination device 632 to utilize the fifth IoT Illumination device 630 as the relay device to facilitate communication between the first IoT illumination device 622 and the sixth IoT illumination device 632. For example, the first IoT illumination device 622 may be instructed to send all information intended for the sixth IoT illumination device 632 to the fifth IoT illumination device 630 for subsequent transmission to the sixth IoT illumination device 632. The sixth IoT illumination device 632 may be instructed to send all information intended for the first IoT illumination device 622 to the fifth IoT illumination device 630 for subsequent transmission to the first IoT illumination device 622. In some cases, sixth IoT illumination device 632 may be instructed to ignore information communicated directly from the first IoT illumination device 622. In some cases, the first IoT illumination device may be instructed to ignore information communicated directly from the sixth IoT illumination device 632. In some cases, information may include commands. It may be appreciated that this is just an example and any other IoT illumination device in the third set of IoT illumination device 640 may have been selected if one of these other IoT illumination devices is better suited as a relay device. In addition, in some cases, a plurality of relay devices may be designated in the third set of IoT illumination device 640 to provide effective and reliable communication among IoT illumination devices in the third set of IoT illumination devices 640.

Figure 8:
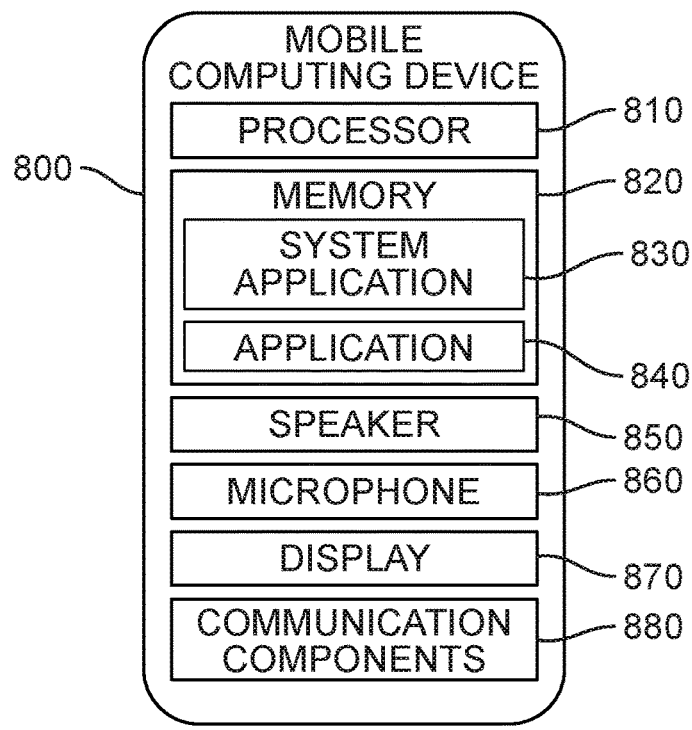
FIG. 8 is a schematic view of a mobile computing device of FIG. 1 according to an embodiment.

FIG. 8 is a schematic view of a mobile computing device of FIG. 1 according to an embodiment, which can be used to communication with IoT devices in the home. The mobile computing device 800 includes a processor 810 and a memory 820. The memory 820 stores a system application 830 which includes an operating system. The memory 820 also stores at least one application 840. For example, one or more applications 840 may communicate with one or more IoT devices through the Internet and an access point in a home. A user may activate the application 840 using an icon displayed on the mobile computing device 800. However, these one or more applications 840 are only one example of an application which can be stored in the memory 840. One or more applications 840 could be used in communication with an access point of a local wireless network, the Internet or cloud computing systems through a network or local network. The memory 820 may also store other applications such as a global positioning application which may provide the location of the mobile computing device 800. The mobile computing device 800 also includes a speaker 850 to output audio communication and a microphone 860 to receive audio communication from a user. The mobile computing device 800 includes a display 870, which can display a user interface, icons, and other items. The mobile computing device 800 also includes communication components 880 to communicate with an access point or other device.

Figure 9:
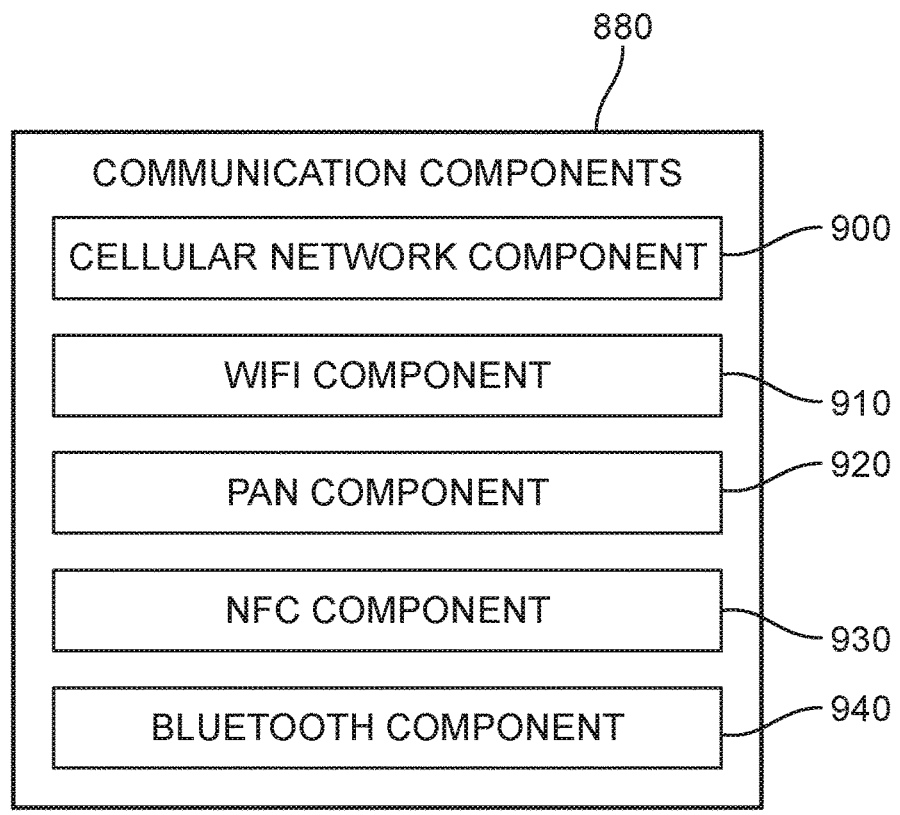
FIG. 9 is a schematic view of communication components of FIG. 8 according to an embodiment.

FIG. 9 is a schematic view of a communication components 880 of FIG. 8 according to an embodiment. The communications components 880 may include a cellular network component 900, a WIFI component 910, a personal area network (PAN) component 920, a near field communication (NFC) component 930, and a Bluetooth component 940. Any type of wireless or wired communication technology may be used to couple the mobile computing device 800 to an access point or to the Internet. One or more of these communication components 880 may be used to wirelessly connect the mobile computing device 800 to an access point. The mobile computing device 800 and its components described in FIG. 8 and FIG. 9 are examples of a mobile computing device which can be utilized by users to implement one or more embodiments described above.

It may be appreciated that the above systems and methods may apply not only to designating a managing Internet of Things (IoT) device and controlled IoT devices for IoT illumination devices, but also to any set of similar IoT devices. In addition, any computing device and any network may be used to implement the above systems and methods. It is also understood that various icons can be displayed on the display of the mobile computing device or other computing devices implementing the methods and systems in embodiments.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method for reducing wireless traffic among a plurality of Internet of Things (IoT) devices and an access point in a home, the method comprising the steps of:

establishing communication among the plurality of IoT devices in the home, wherein the plurality of IoT devices include at least two different types of IoT devices and wherein each type of IoT device is associated with an appliance or object in the home;

receiving IoT type identification signals from each IoT device of the plurality of IoT devices in the home during the established communication among the plurality of IoT devices;

determining, from the IoT type identification signals, a type of IoT device from the at least two different types of IoT devices in the home for each IoT device of the plurality of IoT devices;

establishing a set of IoT devices from among the plurality of IoT devices that are a same type of IoT device;

designating one IoT device from the set of IoT devices as a managing IoT device and the remaining IoT devices in the set of IoT devices as controlled IoT devices;

generating, by the managing IoT device, a table of the controlled IoT devices;

storing in memory of the managing IoT device, the table of the controlled IoT devices;

notifying the access point, by the managing IoT device, to direct communication to one or more IoT devices included in the table of controlled IoT devices to the managing IoT device;

modifying, by the access point, a table stored in memory of the access point to direct information intended for the controlled IoT devices to the managing IoT device;

storing in a memory of each IoT device of the controlled IoT devices an Internet Protocol (IP) address of the managing IoT device;

directing wireless traffic from the access point, which is destined for the controlled IoT devices, to the managing IoT device for transmission from the managing IoT device to the controlled IoT devices to reduce wireless traffic between the access point and the controlled IoT devices;

directing wireless traffic from the controlled IoT devices, which is destined for the access point, to the IP address of the managing IoT device for transmission from the managing IoT device to the access point to reduce wireless traffic between the access point and the controlled IoT devices; and wherein at least one IoT device of the plurality of IoT devices that is a different type of IoT device than the set of IoT devices communicates directly with the access point without directing traffic to the managing IoT device.

2. The method of claim 1, wherein receiving the IoT type identification signals from each IoT device of the plurality of IoT devices occurs during the step of establishing communication among the plurality of IoT devices to provide each IoT device with the type of the other IoT devices.

3. The method of claim 1, wherein establishing the set of IoT devices further comprises forming an ad hoc network among the IoT devices of the plurality of IoT devices having the same type.

4. The method of claim 3, further comprising establishing communication between the managing IoT device and the access point for transmission and reception of the wireless traffic.

5. The method of claim 4, wherein designating one IoT device from the set of IoT devices as the managing IoT device comprises determining a signal strength for each IoT device of the IoT devices in the ad hoc network during communication with the access point.

6. The method of claim 5, wherein designating the one IoT device from the set of IoT devices as the managing IoT device further comprises designating one IoT device of the IoT devices in the ad hoc network having the greatest signal strength among the signal strengths of each of the IoT devices in the ad hoc network as the managing IoT device.

7. The method of claim 6, wherein after designating the managing IoT device, designating all other remaining IoT devices in the ad hoc network as the controlled IoT devices.

8. The method of claim 4, wherein designating one IoT device from the set of IoT devices as the managing IoT device comprises determining which of the IoT devices in the ad hoc network is in closest proximity to the access point during communication with the access point and designating the one IoT device of the IoT devices in the ad hoc network having the closest proximity to the access point as the managing IoT device.

9. The method of claim 1, wherein other IoT devices, which are not included in the set of IoT devices, establish communication directly with the access point.

10. A system for reducing wireless traffic among a plurality of Internet of Things (IoT) devices and an access point in a home, comprising:

at least one memory comprising instructions and at least one hardware processor to execute the instructions within the at least one memory to implement:

establishing communication among the plurality of IoT devices in the home, wherein the plurality of IoT devices include at least two different types of IoT devices and wherein each type of IoT device is associated with an appliance or object in the home;

receiving IoT type identification signals from each IoT device of the plurality of IoT devices in the home during the established communication among the plurality of IoT devices;

determining, from the IoT type identification signals, a type of IoT device from the at least two different types of IoT devices in the home for each IoT device of the plurality of IoT devices;

establishing a set of IoT devices from among the plurality of IoT devices, wherein the IoT devices in the set of IoT devices are a same type of IoT device;

designating one IoT device from the set of IoT devices as a managing IoT device and the remaining IoT devices in the set of IoT devices as controlled IoT devices; and configuring the managing IoT device to be capable of communicating with the access point for wireless traffic, generating a table of the controlled IoT devices to be stored in memory of the managing IoT device;

notifying the access point to direct communication to one or more IoT devices included in the table of controlled IoT devices to the managing IoT device;

configuring the access point to modify a table stored in memory of the access point to direct information intended for the controlled IoT devices to the managing IoT device;

storing in a memory of each IoT device of the controlled IoT devices an Internet Protocol (IP) address of the managing IoT device;

wherein the managing IoT device is configured to direct wireless traffic received from the access point, which is destined for the controlled IoT devices, to the managing IoT device for transmission from the managing IoT device to the controlled IoT devices to reduce wireless traffic between the access point and the controlled IoT devices, wherein the managing IoT device is configured to receive and direct wireless traffic from the controlled IoT devices, which is destined for the access point, to reduce wireless traffic between the access point and the controlled IoT devices; and wherein at least one IoT device of the plurality of IoT devices that is a different type of IoT device than the set of IoT devices is configured to communicate directly with the access point without directing traffic to the managing IoT device.

11. The system according to claim 10, wherein receiving the IoT type identification signals from each IoT device of the plurality of IoT devices occurs during the step of establishing communication among the plurality of IoT devices to provide each IoT device with the type of the other IoT devices.

12. The system according to claim 11, wherein other IoT devices, which are not included in the set of IoT devices, establish communication directly with the access point.

13. The system according to claim 10, wherein establishing the set of IoT devices further comprises forming an ad hoc network among the IoT devices of the plurality of IoT devices having the same type.

14. The system according to claim 13, further comprising establishing communication between the managing IoT device and the access point for transmission and reception of the wireless traffic.

15. The system according to claim 14, wherein designating one IoT device from the set of IoT devices as the managing IoT device comprises determining a signal strength for each IoT device of the IoT devices in the ad hoc network during communication with the access point.

16. The system according to claim 15, wherein designating the one IoT device from the set of IoT devices as the managing IoT device further comprises designating one IoT device of the IoT devices in the ad hoc network having the greatest signal strength among the signal strengths of each of the IoT devices in the ad hoc network as the managing IoT device.

17. The system according to claim 16, wherein after designating the managing IoT device, designating all other remaining IoT devices in the ad hoc network as the controlled IoT devices.

18. The system according to claim 13, wherein designating one IoT device from the set of IoT devices as the managing IoT device comprises determining which of the IoT devices in the ad hoc network is in closest proximity to the access point during communication with the access point and designating the one IoT device of the IoT devices in the ad hoc network having the closest proximity to the access point as the managing IoT device.

19. A system for designating a managing Internet of Things (IoT) device among a plurality of IoT devices in a home to communicate wireless traffic to an access point through the managing IoT device, comprising:

at least one memory comprising instructions and at least one hardware processor to execute the instructions within the at least one memory to implement:

establishing communication among the plurality of IoT devices in the home, wherein the plurality of IoT devices include at least two different types of IoT devices and wherein each type of IoT device is associated with an appliance or object in the home;

receiving IoT type identification signals during the established communication from each IoT device of the plurality of IoT devices to provide each IoT device with a type of other IoT devices;

determining, from the IoT type identification signals, the type of IoT device from the at least two different types of IoT devices in the home for each IoT device of the plurality of IoT devices;

forming an ad hoc network among IoT devices of the plurality of IoT devices having the same type;

determining a signal strength for each IoT device of the IoT devices in the ad hoc network;

determining which of the IoT devices in the ad hoc network has the greatest signal strength among the signal strengths of each of the IoT devices in the ad hoc network during communication with the access point;

designating one IoT device of the IoT devices in the ad hoc network having the greatest signal strength as the managing IoT device and designating the remaining IoT devices in the ad hoc network as controlled IoT devices;

generating a table of the controlled IoT devices to be stored in memory of the managing IoT device;

notifying the access point to direct communication to one or more IoT devices included in the table of controlled IoT devices to the managing IoT device;

configuring the access point to modify a table stored in memory of the access point to direct information intended for the controlled IoT devices to the managing IoT device;

storing in a memory of each IoT device of the controlled IoT devices an Internet Protocol (IP) address of the managing IoT device;

directing wireless traffic between the access point and the controlled IoT devices in the ad hoc network through the managing IoT device to reduce wireless traffic between the access point and the controlled IoT devices;

wherein at least one IoT device of the plurality of IoT devices that is a different type of IoT device than the set of IoT devices is configured to communicate directly with the access point without directing traffic to the managing IoT device.

20. The system according to claim 19, wherein other IoT devices, which are not included in the ad hoc network, establish communication directly with the access point.

* * * * *